United States Patent [19]
Doeff et al.

[11] Patent Number: 5,916,710
[45] Date of Patent: *Jun. 29, 1999

[54] SODIUM COBALT BRONZE BATTERIES AND A METHOD FOR MAKING SAME

[75] Inventors: Marca M. Doeff, Hayward; Yanping Ma; Steven J. Visco, both of Berkeley; Lutgard DeJonghe, Lafayette, all of Calif.

[73] Assignee: The Regents of The University of California, Oakland, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/729,102

[22] Filed: Oct. 11, 1996

Related U.S. Application Data

[63] Continuation of application No. 08/065,110, May 19, 1993, abandoned.

[51] Int. Cl.$^6$ .............................. H01M 4/52; H01M 10/40
[52] U.S. Cl. ......................... 429/304; 429/213; 429/231.3
[58] Field of Search ...................... 429/190, 212, 429/213, 218, 192, 193; 29/623.5

[56] References Cited

U.S. PATENT DOCUMENTS

| | | | |
|---|---|---|---|
| 4,514,478 | 4/1985 | Bender et al. ........................ | 429/196 |
| 4,695,521 | 9/1987 | Schacklette et al. .................... | 429/194 |
| 4,780,381 | 10/1988 | Schacklette et al. .................... | 429/197 |
| 5,011,748 | 4/1991 | Schacklette et al. ....................... | 429/50 |
| 5,051,325 | 9/1991 | Shishikura et al. ...................... | 429/197 |
| 5,302,474 | 4/1994 | Schackle ................................. | 429/112 |

OTHER PUBLICATIONS

K. West, et al. "Solid–State Sodium Cells—An Alternative to Lithium Cells?", Journal of Power Sources, v. 26, pp. 341–345 (1989). (Month Unknown).

J.Y. Cherng, et al. "Applications of Multivalent Ionic Conductors to Polymeric Electrolyte Batteries", Solid State Ionics, v. 28–30, pp. 857–861 (1988). (Month Unknown).

K. West, "Solid State Sodium Batteries", Chapter 7 of "Lithium Batteries, New Materials, Developments and Perspectives," G. Pistoia, Ed., Elsevier (1994). (Month N.A.).

M.Z.A. Munshi, et al. "Sodium $V_6O_{13}$ Polymer Electrolyte Cells", Journal of Electrochemical Society, v. 136, N. 6, (Jun. 1989).

Primary Examiner—Stephen Kalafut
Attorney, Agent, or Firm—Paul R. Martin; Henry Sartorio; David J. Aston

[57] ABSTRACT

A solid state secondary battery utilizing a low cost, environmentally sound, sodium cobalt bronze electrode. A method is provided for producing same.

4 Claims, 8 Drawing Sheets

SODIUM COBALT BRONZE BATTERIES AND A METHOD FOR MAKING SAME

This application is a continuation of Ser. No. 08/065,110, filed May 19, 1993, now abandoned.

The invention described herein was made with Government support under Contract No. DE-AC03-76SF00098 between the U.S. Department of Energy and the University of California for the operation of Lawrence Berkeley Laboratory. The Government has certain rights in this invention.

FIELD OF THE INVENTION

The present invention relates to a solid state secondary battery utilizing positive electrodes composed of sodium cobalt bronzes. Additionally, the present invention provides a method for the fabrication of sodium cobalt bronzes for use in solid state batteries.

BACKGROUND OF THE INVENTION

Sodium cobalt bronzes have recently found use in room temperature batteries with organic liquid electrolytes and sodium, sodium alloy or sodium composite anodes. These materials exist in several phases, depending upon composition (x in $Na_xCoO_2$) and the method of preparation. Most notably, the $P_2$ phase $Na_xCoO_2$ has been shown to undergo electrochemical intercalation and de-intercalation of sodium reversibly over a range of x=0.3–0.9 without undergoing structural changes, and thus is particularly well-suited for use in secondary batteries.

The general procedure for synthesizing sodium cobalt bronzes is to heat an intimately mixed sample of $Co_3O_4$ and a sodium salt (e.g. $Na_2O_2$ or $Na_2CO_3$) in air or oxygen to 400° C. or higher for several hours. Compounds ranging from about x=0.5–1 in $Na_xCoO_2$ may be prepared chemically, using this method. The phase (O3, O'3, P3 or P2) that is obtained is dependent upon the ratio of reactants (stoichiometry) and the reaction temperature. In all four phases, sodium ions are located between sheets of layered $(CoO_2)_n$ octahedra. In phases with low sodium ion content, however, the coordination of the ions is trigonal prismatic, and for higher sodium content, the coordination is octahedral, when compounds are prepared via this method.

It has been recognized that because these compounds are mixed conductors, they are good candidates for battery materials. Indeed, electrochemical intercalation and deintercalation of sodium ions occurs with facility at ambient temperatures in batteries with sodium anodes and liquid electrolytes. In the case of the O3, O'3 and P'3 compounds, reversible transitions between the phases occur, resulting in a multi-plateau charge/discharge curve (voltage vs. time for galvanostatic charge or discharge). Thus the fully reduced O3 phase $NaCoO_2$ with an open circuit voltage of about 2.0 vs. Na is transformed to the O'3 phase as sodium ions are extracted (a $Na/NaCoO_2$ cell is charged), and then subsequently to the P3 phase as is shown in equation 1. Likewise, O'3 is transformed to the O3 phase upon discharge and the P3 phase upon charge, and the P3 phase is converted to O'3 and O3 upon discharge.

$$O3 \Longleftrightarrow O'3 \Longleftrightarrow P3 \quad (1)$$

The composition ranges from about x=1 in $Na_xCoO_2$ (O3 phase) to about x=0.5 (P3 phase) and the voltage vs. Na from about 2.0 to 3.5. This gives a theoretical energy density of 300 Wh/kg for the sodium cobalt bronzes in the O3, O'3 or P3 phases with Na anodes.

The sodium cobalt bronze prepared in the P2 phase (starting composition $Na_{0.67}CoO_2$) also exhibits a multi-plateau charge/discharge curve, but X-ray diffraction studies have shown that no phase transitions occur over x=0.3 to 0.9 in $Na_xCoO_2$ at room temperature. Rather the plateaus are attributed to electronic effects or to ordering of the Na ions between the layers and the slight shifts or distortions required to accomodate these ions.

Because no major structural changes occur over Δx=0.6 Na/Co, the P2 sodium cobalt bronze is expected to have better reversibility than the other phases. Cells with $Na_{3.75}Pb$ anodes, organic liquid electrolytes and P2 sodium cobalt bronze cathodes have been cycled 300 times or more at current densities of 1–2 mA/cm2, and 1000 cycles to 50% capacity or more have been projected. The slightly greater capacity and higher voltage (up to 4.0 V) give a higher theoretical energy density (440 Wh/kg) for the P2 phase as well, making this sodium cobalt bronze the preferred cathode material for sodium batteries with liquid electrolytes.

While the remarkable reversibility, ease of synthesis, and rather wide capacity range make the sodium cobalt bronzes ideal candidates for sodium battery cathodes, the fairly low gravimetric theoretical energy density is a drawback. In conventional cells, practical energy densities are often less than one-fourth that of the theoretical due, in part, to the rather heavy current collectors needed to contain the liquid. Thus a working Na/P2 $Na_xCoO_2$ cell with conventional electrolyte would probably have a gravimetric energy density of 110 Wh/kg or less.

In spite of the attractive features of the sodium cobalt bronze system, the use of a sodium anode with an organic liquid electrolyte is widely considered to be a hazard, and has represented a stumbling block to the further development of this type of battery.

Another difficulty is the relatively low practical gravimetric energy density expected for devices based on NaxCoO2 with liquid electrolytes, due to the heavy current collectors (cans or coins) needed to contain the liquid and components.

Furthermore, it is usually necessary to replace sodium with an alloy such as $Na_{3.75}Pb$ or a sodium composite electrode in order to improve cycling, due to the tendency of sodium metal to form dendrites in the presence of a liquid electrolyte upon cell charge. This decreases the theoretical energy density further (350 Wh/kg for a $Na_{3.75}Pb/P2\ Na_xCoO_2$ cell). Still, the high theoretical volumetric energy densities (estimated to be over 1600 Wh/L for Na/P2 $Na_xCoO_2$, and 1500 Wh/L for $Na_{3.75}Pb/P2\ Na_xCoO_2$) are attractive. FIG. 1 shows theoretical volumetric and gravimetric energy densities of cells with P2 sodium cobalt bronze cathodes and various sodium source anodes for Δx Na/Co=0.6).

SUMMARY OF THE INVENTION

The present invention is a solid state secondary battery utilizing sodium cobalt bronzes for the positive electrode and a method for fabricating same.

It is an object of the present invention to provide a method for manufacturing sodium cobalt bronzes.

It is a further object of the present invention to provide a method for manufacturing solid state batteries utilizing sodium cobalt bronzes.

It is a further object of the present invention to provide a method for manufacturing electrodes which are environmentally sound.

It is a further object of the present invention to provide a method for manufacturing electrodes which do not require the use of a liquid electrolyte.

It is a further object of the present invention to provide a method for manufacturing an environmentally sound electrode for solid state batteries.

It is a further object of the present invention to provide an easily implemented method for manufacturing electrodes.

It is a further object of the present invention to provide a cost effective method for manufacturing electrodes.

It is a further object of the present invention to provide a method for manufacturing electrodes which may be used in rocking chair cells.

These and other objects and features of the invention will become more fully apparent when the following detailed description of the invention is read in conjunction with the accompanying drawing.

DETAILED DESCRIPTION OF THE INVENTION

In this invention, the traditional liquid electrolyte is replaced with a solid polymer electrolyte (separator) such as polyethylene oxide complexed with sodium triflate or another sodium salt. The cathode consists of a composite of the electroactive material ($Na_xCoO_2$) and polymer electrolyte, and the anode may be sodium, a sodium alloy, or a composite containing a material that intercalates sodium anodically, such as carbon. The latter configuration is known as a rocking chair battery. No solvent is necessary for successful functioning of the cell, and the use of all solid state components ensures safe operation even under conditions of abuse. The thin (50 $\mu$m or less) electrodes and separators may readily be assembled into single cells simply by stacking components between thin current collectors such as metallized plastic sheets. Not only does this configuration represent a potential savings in practical energy density due to the low weight of the current collectors, but components may be stacked easily into a bipolar series arrangement; an option that is difficult or impossible to do when liquid electrolytes are used.

Figure 1:
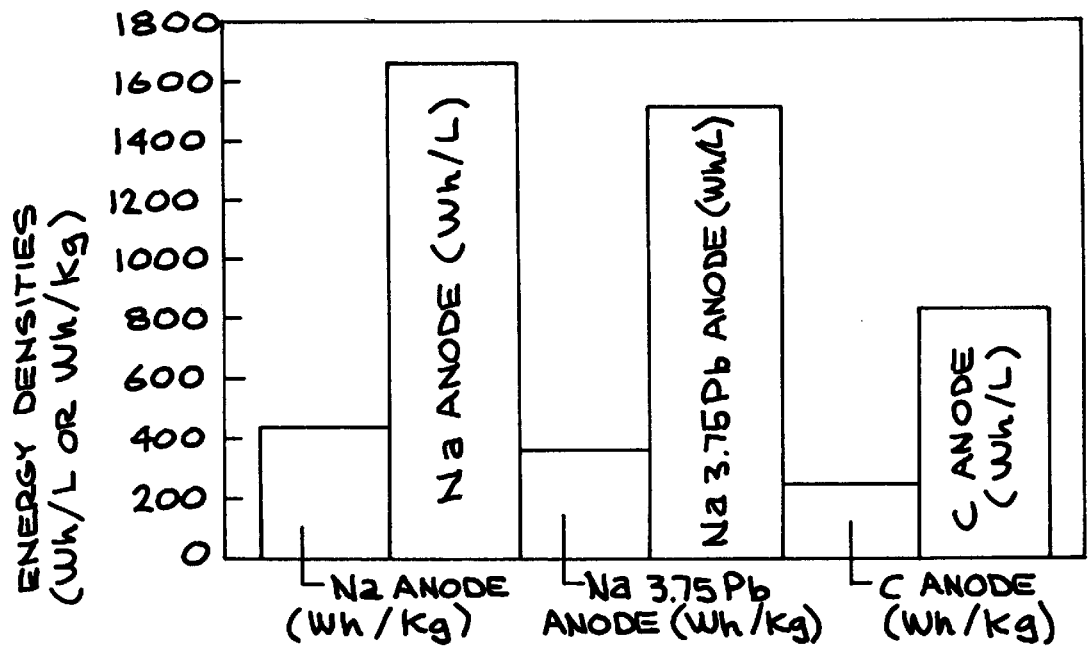
FIG. 1 Theoretical Energy Densities for Sodium Cobalt Cells.
Figure 2:
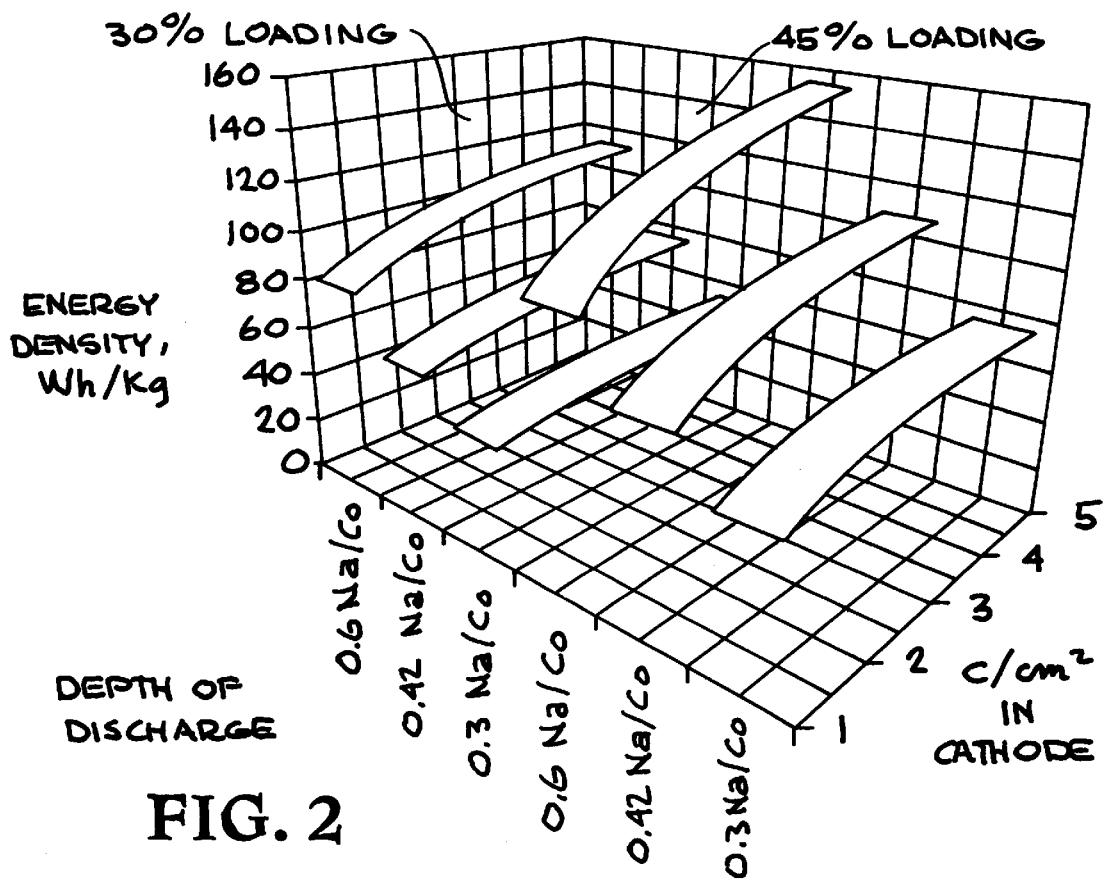
FIG. 2 Practical Energy Densities for Sodium Cobalt/ PEO/Sodium Cells.

By using solid state components, it is possible to maximize practical energy densities by using lightweight, ultrathin battery containers or current collectors such as metallized plastic sheets. FIG. 2 shows estimated practical gravimetric energy densities for solid state Na/P2 $Na_xCoO_2$ cells with 10 $\mu$m polymer electrolyte separators (a complex of polyethylene oxide with sodium triflate, $P(EO)_8NaTf$) and 5 $\mu$m metallized plastic sheets as current collectors. The data are presented as a function of cathode capacity and loading level as well as extent of reaction, and it is assumed that a twofold excess of sodium is used. Practical gravimetric energy densities of about 150 Wh/kg are achievable for the maximum extent of reaction in a cell with a cathode consisting of 45 percent by weight electroactive material. A further savings in gravimetric energy density can be realized if cells are arranged in a series stack, a configuration difficult to achieve when liquid electrolytes are used.

Figure 11:
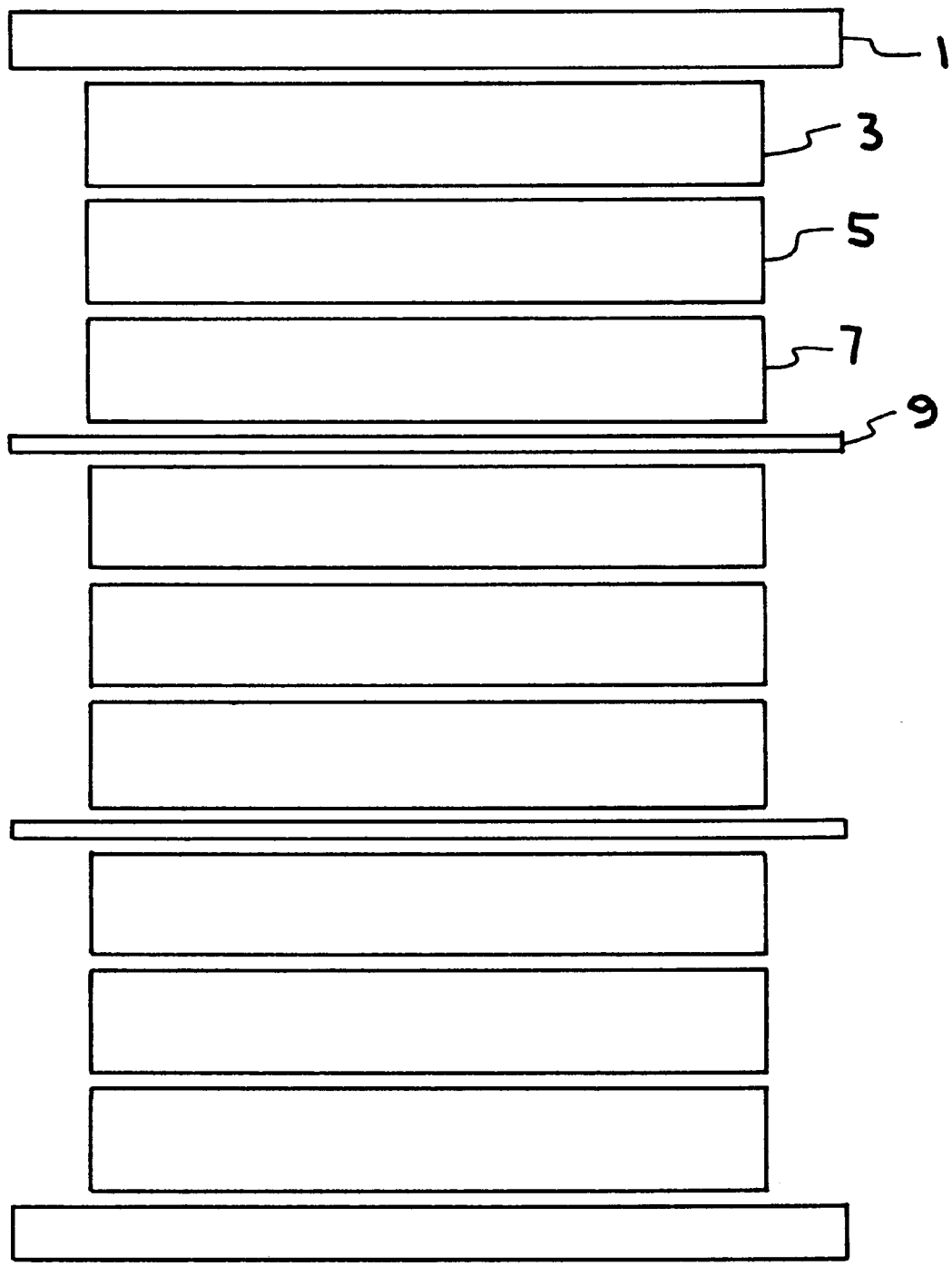
FIG. 11 shows a cut-away side view of a solid state battery in which sodium cobalt bronze cathodes have been used in conjunction with a polymer electrolyte and a sodium electrode in a series stack.

A three cell battery such as the one pictured in FIG. 11 is less than 0.05 cm thick, would have a practical gravimetric energy density of about 160 Wh/kg and would be a 12 V system, when fully charged. The main cell as pictured is comprised of a pair of end current collectors 1 between which is sandwiched three subcells each comprised of a sodium cobalt bronze cathode 3, a polymer electrolyte separator 5, and a cathode 7. These materials are all in physical contact with one another and are connected to the next subcell by a connecting current collector 9.

Another important advantage to the completely solid state system which is the subject of the present invention is that of safety. The combination of an alkali metal with liquid electrolytes is widely regarded to be hazardous, due to the high reactivity of this combination. The substitution of a solid polymer electrolyte in the separator and the composite cathode for the liquid electrolyte in the conventional cells avoids this danger entirely.

Sodium Cobalt Bronze Cells with Sodium Anodes

Cells consisting of Na anodes, polymer electrolyte separators and $Na_{0.7}CoO_2$ composite cathodes were assembled, charged and cycled at various rates. Cells containing $P(EO)_8NaTf$ as the polymer electrolyte were heated to 85–90° C. in order to make components ionically conducting. The melting point of sodium (97° C.) imposes an upper operating temperature limit on the cells. Although molten sodium does not adversely affect the performance per se, it tends to flow and cause inadvertent shorting. Some of the cells constructed herein actually shorted due to temporary temperature excursions, but recovered completely and continued to cycle without deterioration.

It has been observed that sodium batteries with liquid or polymer electrolytes have a tendency for the anode to form dendrites readily upon charge, leading to shortened cycle life. Although early results in the inventor's laboratory seemed to corroborate this observation, (cells tended to have lower than expected voltages upon charge or exhibited voltage instability), it was found that careful preparation of sodium electrodes greatly decreased this tendency. As long as proper precautions were taken to ensure that the sodium was very pure and that the sodium surface was very smooth and flat, cells could be cycled reliably. It is possible that using solid polymer electrolytes with sodium anodes may discourage dendrite growth, and constitute another reason to use solid components with this battery system.

Figure 3:
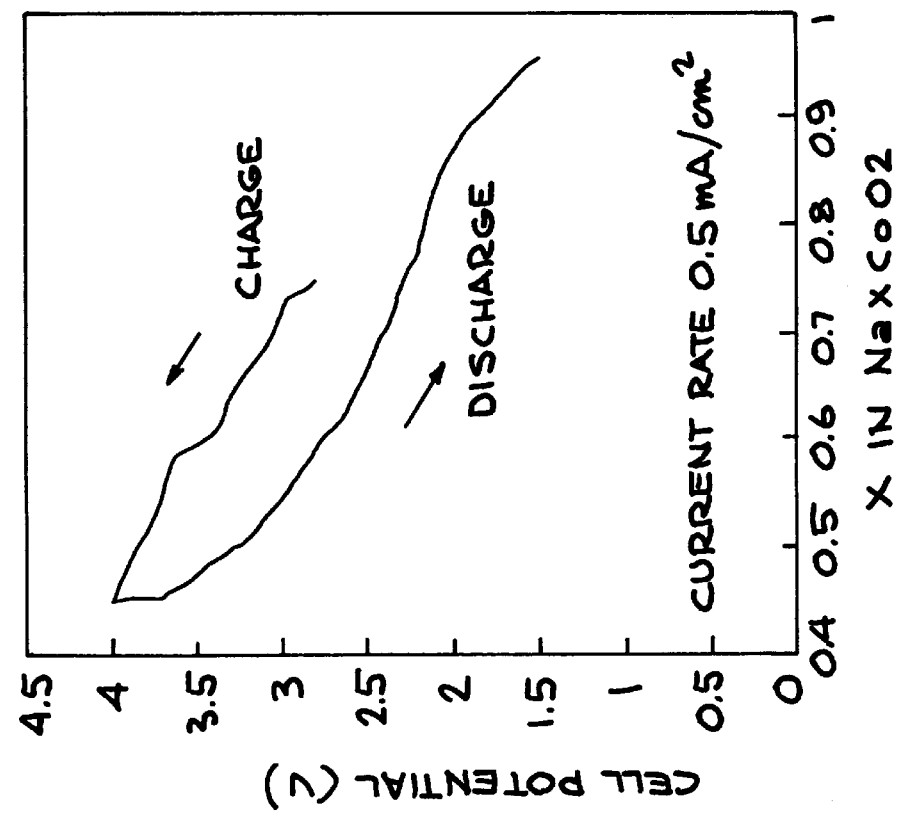
FIG. 3 shows a first cycle for a typical solid state cell using a sodium cobalt bronze cathode with a sodium anode.

Because $Na_{0.7}CoO_2$ is in the partially discharged state, cells must first be charged before use. FIG. 3 shows the first cycle of a $Na/P(EO)_8NaTf/Na_{0.7}CoO_2$ cell at 0.5 mA/cm2. The charge passed corresponds to nearly $\Delta Na/Co=0.6$ for this example. The discharge curve shows features similar to those seen in the liquid cells at room temperature, however, suggesting that no phase change occurred even at the somewhat higher operating temperature of the polymer cells. Structural studies on the sodium cobalt bronzes indicate that interchange between the P2 and other phases occurs with difficulty and only at temperatures above 700° C. The expected range of composition is $Na_{0.3}CoO_2$ to $Na_{0.9}CoO_2$. The slight variation from this range shown in FIG. 3 may be attributed to the slight overcharge required initially or to a small deviation of the starting material from the expected stoichiometry as written in equations (2) and (3).

Figure 4:
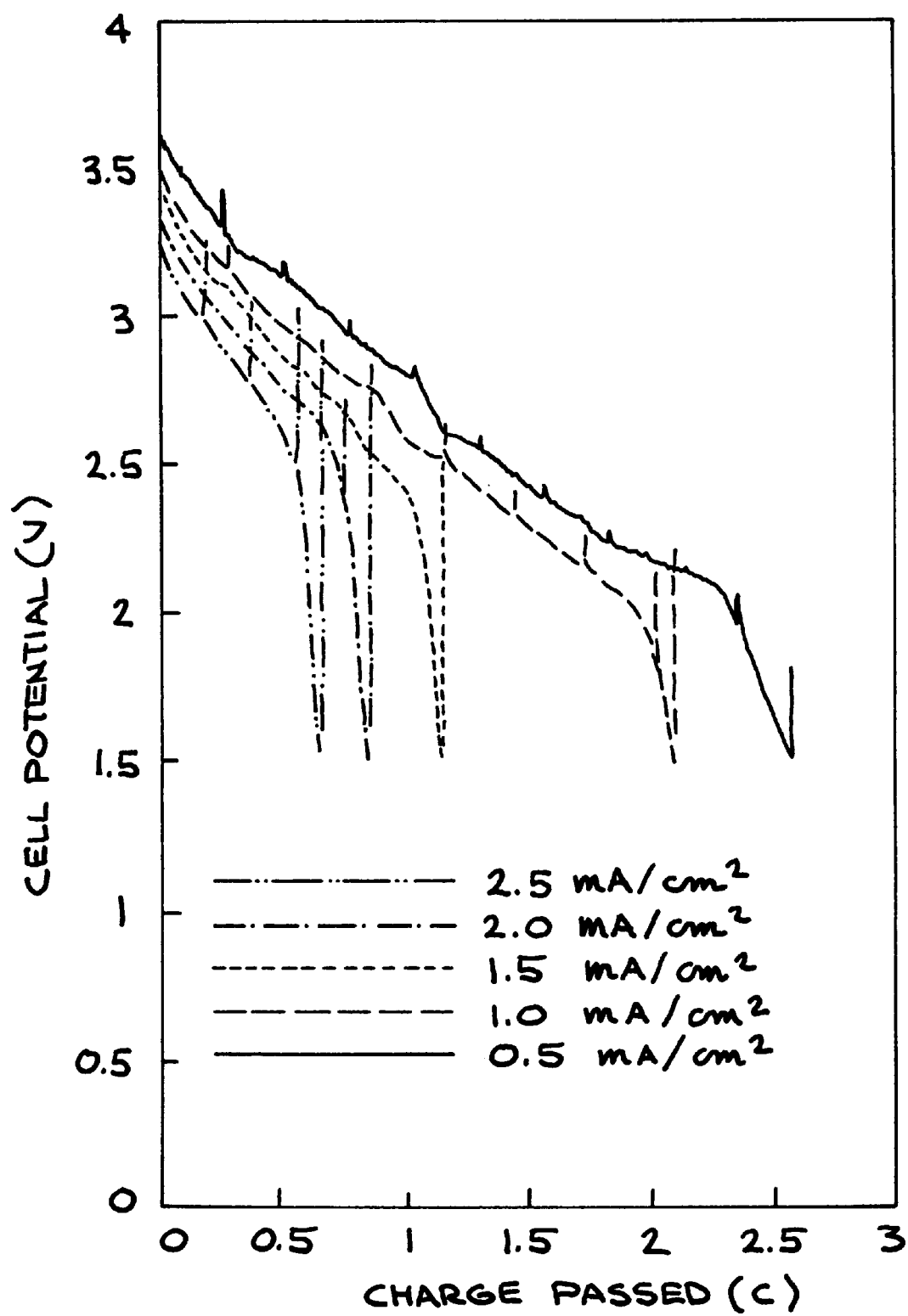
FIG. 4 shows cell potential as a function of charge passed for a typical solid state cell using a sodium cobalt bronze cathode.

FIG. 4 shows discharge curves at various current densities for the $Na/P(EO)_8NaTf/Na_{0.7}CoO_2$ system. Whereas the best utilization is obtained at moderate rates (0.5–1 mA/cm2), it is clear that these cells can easily withstand current densities up to 2.5 mA/cm2. This suggests that this system may be useful in applications requiring high power densities.

All indications to date show that the P2 sodium cobalt bronze is extremely reversible in a solid state cell as well as in a liquid cell. One solid polymer cell underwent more than seventy cycles at 0.5 mA/cm2(charge and discharge) to 50% capacity or more without significant deterioration. Other examples shorted due to inadvertent melting of sodium during cycling, causing the voltage to drop to 0, but recovered quickly and continued to cycle without any adverse effect, indicating the remarkable robustness of these cells.

The $Na/P(EO)_8NaTf/Na_{0.7}CoO_2$ battery has the highest theoretical energy density of any of the batteries discussed herein. This feature, and the high rate capability suggest a potential use in electric vehicles. The all-solid state components mean improved safety, easily fabricated series stacks and greater reliability as well. One possible drawback is the sensitivity to high temperatures due to the low melting point of the sodium. However, if cells can be designed to contain the molten sodium so that spillage does not occur, or if temperature excursions can be prevented, this is the preferred configuration for all solid state sodium cobalt bronze batteries.

A preferred embodiment of the inventive cell has a cathode comprised 30–45% by weight P2 sodium cobalt bronze ground to a particle size of 1–2 microns, 15–20% by weight carbon black, 2% by weight brij-35 carbon dsipersant, with the remainder made up of $P(EO)_8NaTf$. These material are mixed with a solvent such as acetonitrile, cast onto Teflon plates, dried, cut to size, and then vacuum dried prior to use. This cathode is used in conjunction with a $P(EO)_8NaTf$ separator(polymer electrolyte) and a sodium anode. The preferred operating temperature range for the cell is between 85–90° C.

Sodium Cobalt Bronze Cells with Sodium/Lead Alloy Anodes

Cells consisting of $Na_{3.75}Pb$ anodes, polymer electrolyte separators and $Na_{0.7}CoO_2$ composite cathodes were assembled, charged and cycled at various rates. When polyethylene oxide complexes were used as the conducting electrolyte, cells were heated above 90° C. to make components tonically conductive. Because $Na_{3.75}Pb$ has a higher melting point than pure Na (about 350° C. rather than 97° C.) there is a wider usable temperature range in which to operate the cells. Higher temperatures generally increase the ionic conductivity of the polymer electrolytes, and presumably improve electrode kinetics as well, allowing higher rate discharges (greater current densities) and thus improved power densities.

As with the Na anodes in the cell cyclability was demonstrated to be a strong function of the quality of the anode surface. Rough anodes tended to cause voltage instability upon charge and incomplete charging (perhaps due to transient dendrite formation) leading to poor cell reversibility. Carefully made, smooth anodes gave very reliable results, however; cells have been shown to cycle over 190 times with little capacity loss.

Figure 5:
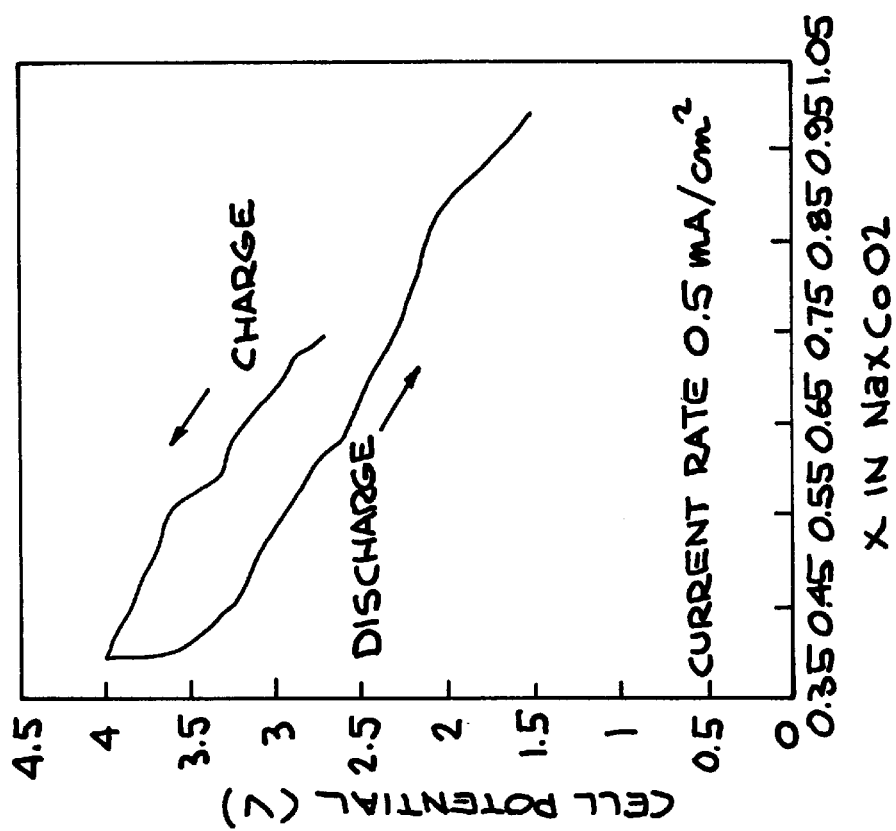
FIG. 5 shows a first cycle for a typical solid state cell using a sodium cobalt bronze cathode with a sodium/lead anode.

$Na_{0.7}CoO_2$ is in the partially discharged state; therefore cells must first be charged before use. FIG. 5 shows a first charge and discharge of a typical example at 0.5 mA/cm2 and 100° C. The discharge between 4.0 and 1.5 volts covers a range of 0.6 Na/Co. (The expected range of x=0.3–0.9 in $Na_xCoO_2$ is shifted slightly; this may be due to a slight departure of the starting material stoichiometry from that expected based on equations 2 and 3, or it may reflect the slight overcharge required for this system initially).

Figure 6:
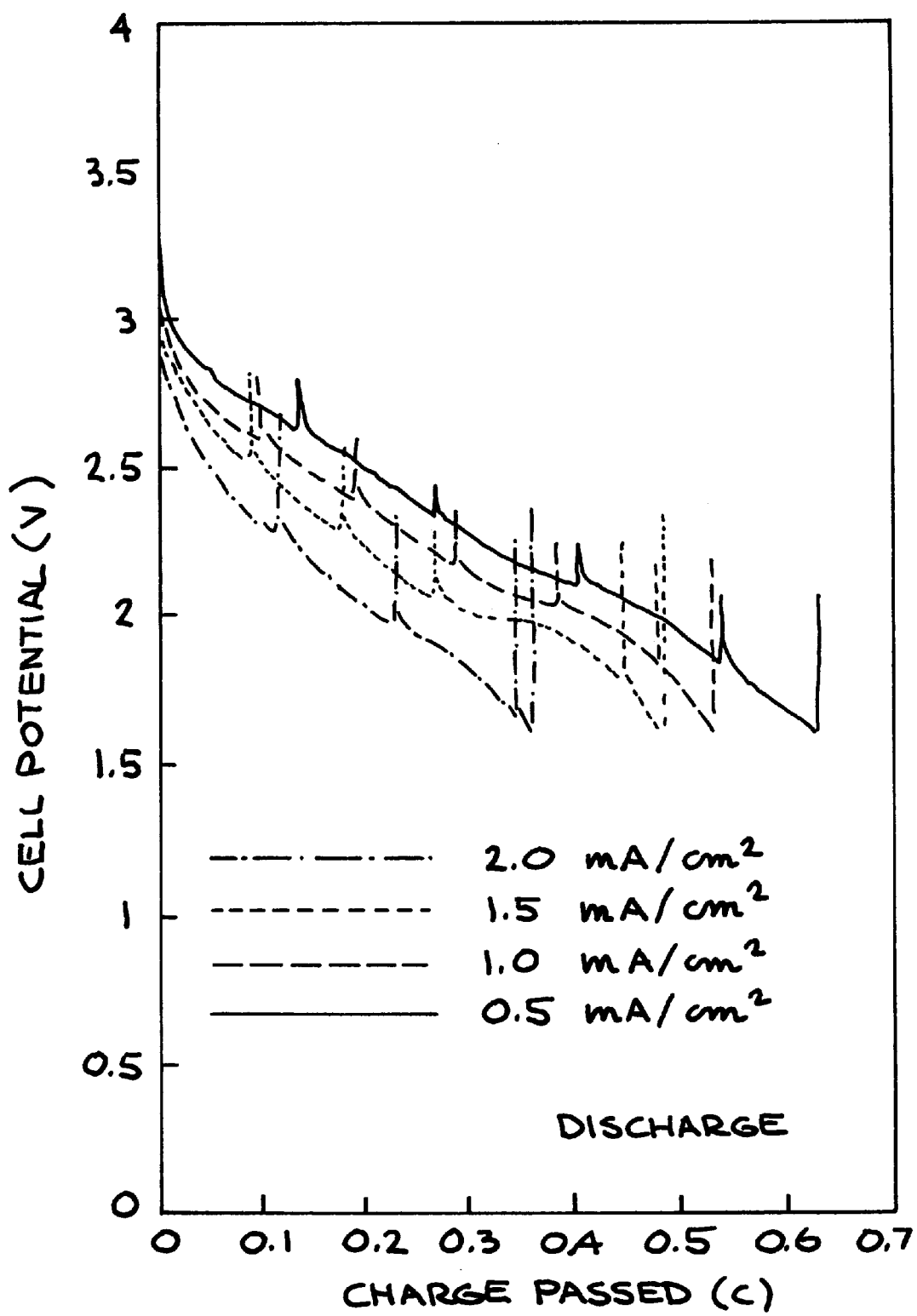
FIG. 6 shows cell potential as a function of charge passed for a typical solid state cell using a sodium cobalt bronze cathode with a sodium/lead anode.

FIG. 6 shows discharge curves as a function of current density for a $Na_{3.75}Pb/P(EO)_8NaTf/Na_xCoO_2$ cell at 100° C. Although there is a slight fall-off of capacity as rate is increased, it is clear that these cells can readily withstand a current density as high as 2 mA/cm2. This characteristic suggests that this system may be a good candidate for applications that require high power densities.

Figure 7:
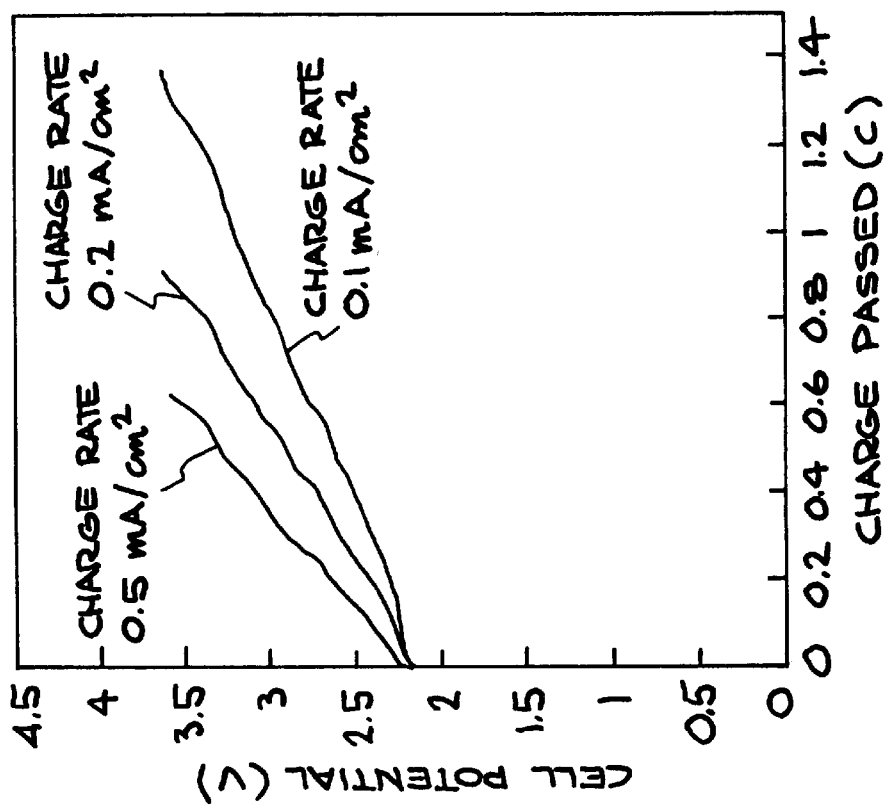
FIG. 7 shows charge curves as a function of current densities.

FIG. 7 shows charge curves as a function of current densities. As with the discharge curves, capacity increases with lower current densities, but cells charge reliably even at higher current densities, without any sign of voltage instability due to dendrite growth. The rapid charging (typically about one-half hour or C/2), is another desirable characteristic for electric vehicle applications.

Figure 8:
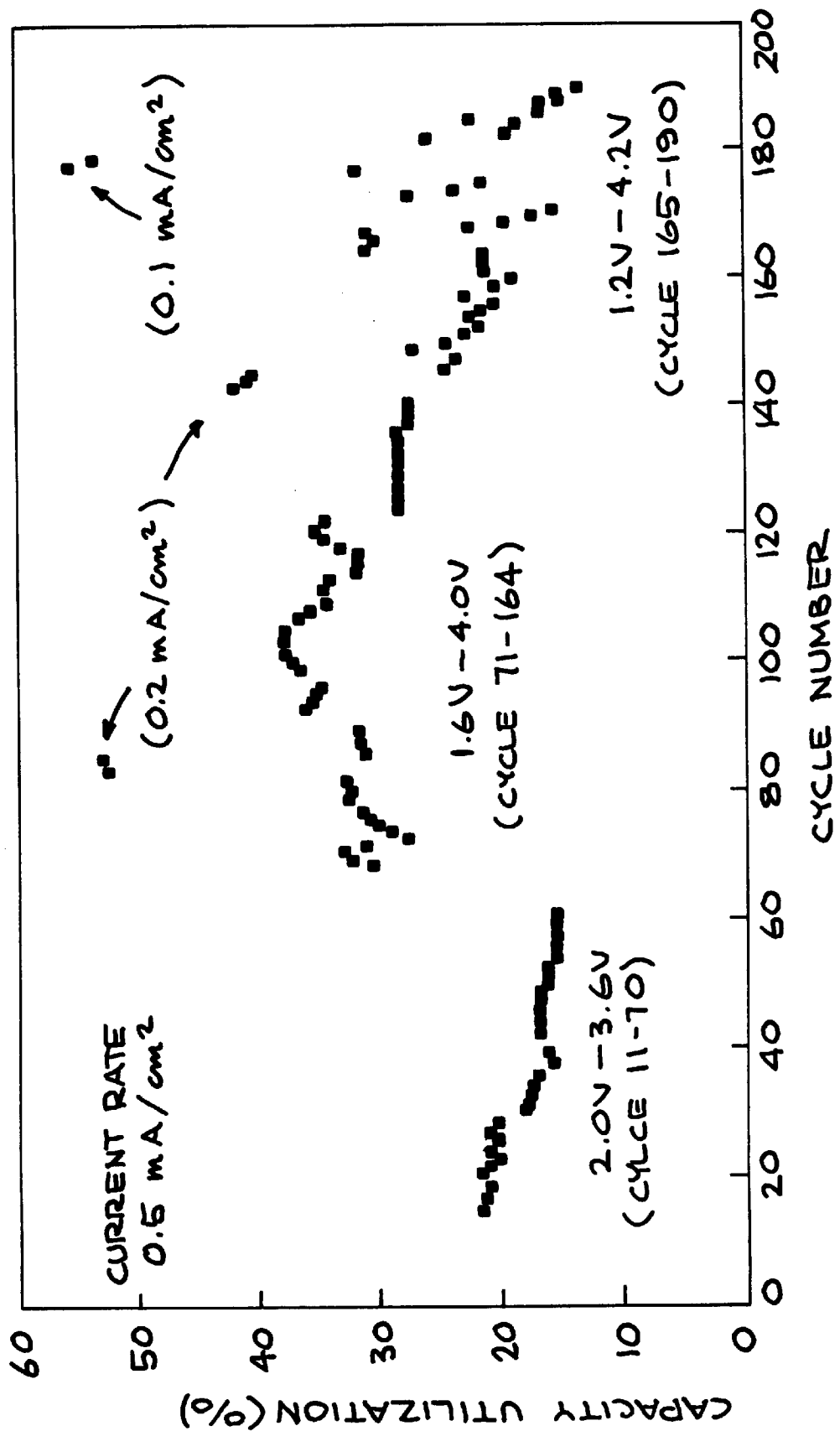
FIG. 8 shows capacity as a function of cycle number.

FIG. 8 shows capacity as a function of cycle number for a cell that underwent 190 shallow to medium depth cycles ($\Delta Na/Co=0.3-0.4$) at a rate of 0.5 mA/cm2 for both charge and discharge. The first 60 cycles were shallow, with voltage limits between 2.0 and 3.6 V. This was later increased to 1.6 and 4.0 V (thus, more of the cell capacity was utilized), without adversely affecting the performance and finally between 1.2 and 4.2 V. Indeed, this example was inadvertently overdischarged to 0 V; after a short period of rest (approximately one hour), the cell then recovered to 0.7 V, and continued to cycle without any sign of deterioration. Some cells have also been deep cycled more than 60 times, with full utilization of the cathode capacity ($\Delta Na/Co=0.4-0.6$).

Figure 9:
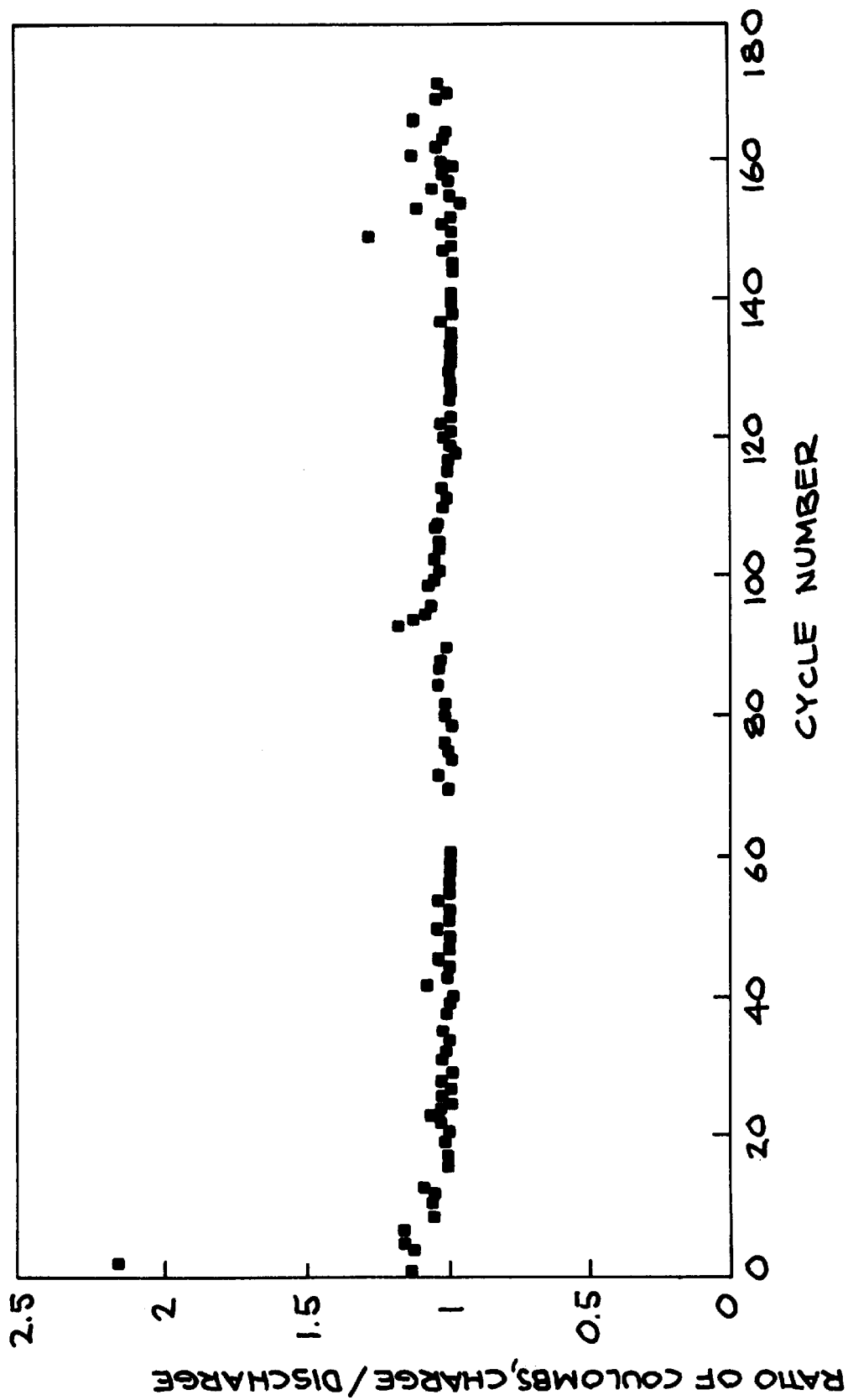
FIG. 9 shows charge efficiency for a cell typical of the present invention.

FIG. 9 shows the charge efficiency (ratio of coulombs passed during charge to that passed during discharge) for 170 cycles. Cells typically must be slightly overcharged initially, but efficiency approaches 100% for later cycles, with only occasional slight overcharges necessary.

The $Na_{3.75}Pb/PEO/Na_xCoO_2$ system is a particularly successful one; the remarkable reversibility, the ability to withstand high discharge rates and undergo rapid charging, and the safety features associated with all solid-state components make it an excellent choice for electric vehicle applications. While there is a slight energy density penalty due to the use of the $Na_{3.75}Pb$ anode, the wider temperature range that can be used with this system make this the preferred battery for applications in which occasional temperature excursions may not be preventable.

Sodium Cobalt Bronze Cells with Carbon Anodes; Rocking Chair Batteries.

Cells consisting of sodium cobalt bronze electrodes, polyethylene oxide separators and composite carbon electrodes were assembled and heated above 90° C. for testing. The composite carbon electrodes function as anodes for this system. Sodium intercalates into carbon reductively upon cell charge, and de-intercalates upon cell discharge.

Because the sodium cobalt bronze electrode undergoes intercalation and de-intercalation of sodium ions as well (but in opposition to the carbon electrode), the system is an example of a "rocking chair" battery, in which ions "rock" back and forth between the two electrodes.

Cells are assembled with both electrodes in the discharged or partially discharged state. Because none of the components are air-sensitive, no special effort to exclude contact with air is necessary during fabrication or cell assembly, unlike the cases with Na or $Na_{3.75}Pb$ anodes.

In principle, there is an added insurance of safety because no sodium is present in the metallic state either during charge or discharge. However, care must be taken to match the capacities of the electrodes carefully or else cell performance will be adversely affected. For example, if a cell in which there is excess capacity in the cathode is overdischarged, sodium metal will plate on the carbon electrode surface, negating the safety advantage. Lower capacity in the cathode, on the other hand, will prevent the cell from attaining the maximum possible voltage upon charge. Although the cell will still function, the energy density will be lowered from that of idealized cells. There is also a slight irreversible loss of sodium during the intercalation into the carbon electrode.

Figure 10:
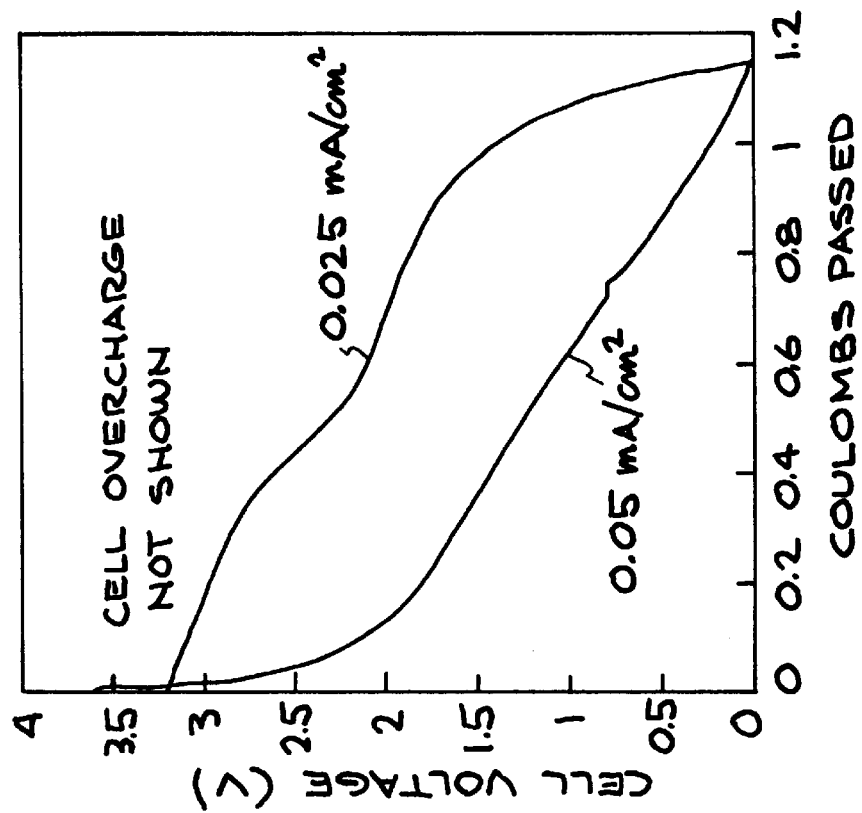
FIG. 10 shows the preliminary results for a rocking chair cell constructed with a sodium cobalt bronze cathode.

FIG. 10 shows the preliminary results for an unoptimized sodium ion rocking chair cell with a solid polymer electrolyte, cathode consisting of P2 phase $Na_{0.7}CoO_2$ in $P(EO)_8NaTf$, and an anode consisting of petroleum coke (ground 25 hours in an attritor mill), in $P(EO)_8NaTf$. The charge capacities of the electrodes were matched initially, and loading levels were 30% by weight electroactive material for both. Cells were heated to 110° C. before initial charging at 25 $\mu A/cm2$. Some overcharging (20% of initial capacity) improved the discharge performance of the cells (overcharge not shown). In particular, it is expected that higher rates of discharge, and longer periods of discharge above 1 V should be readily attainable once the cell has been optimized.

Because of their rather low theoretical gravimetric energy density and rate capabilities, use of the $Na_xCoO_2$ rocking chair cells would be restricted to less demanding applications than electric vehicle use. By substituting a polyethylene oxide that has been chemically modified for lower temperature operation (e.g. the so-called amorphous PEOs), these cells might find use in consumer applications, and whenever safety is the paramount concern.

EXAMPLE 1

The P2 sodium cobalt bronze of formula $Na_{0.7}CoO_2$ was prepared from $Co_3O_4$ and either $Na_2O_2$ or $Na_2CO_3$ as shown in equations (2) and (3).

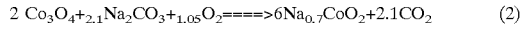

$$2\ Co_3O_4 +_{2.1} Na_2CO_3 +_{1.05} O_2 ====> 6Na_{0.7}CoO_2 + 2.1 CO_2 \quad (2)$$

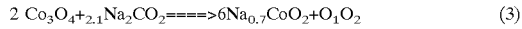

$$2\ Co_3O_4 +_{2.1} Na_2CO_2 ====> 6Na_{0.7}CoO_2 + O_1O_2 \quad (3)$$

Samples were prepared by hand mixing and grinding together the $Co_3O_4$ and sodium salt in the appropriate proportions, then pelletizing. The pellets were heated to 750° C. under oxygen for at least 30 hours, and the product ground by hand or by ball milling until it was a fine powder (1–2 $\mu m$ particle size). $Na_{0.7}CoO_2$ made from sodium peroxide and from sodium carbonate had identical properties.

$Na_{0.7}CoO_2$ electrodes were made from acetonitrile solutions of polymer electrolyte in which the electroactive material and carbon were dispersed. The solution was 2–5 percent by weight solids; 30–45% of which was electroactive material, 7–20% carbon, 2% carbon dispersant and remainder polymer electrolyte. The electrolyte consisted of a sodium ion conducting polymer (e.g. polyethylene oxide) complexed with a salt such as sodium trifluoromethanesulfonate (NaTf) or sodium perchlorate ($NaClO_4$) in a ratio of 8–20 ethylene oxide units per Na+. The solutions were cast into glass rings onto Teflon plates and allowed to air dry. The resulting electrodes which were approximately 50 $\mu m$ thick, were cut to the desired size and vacuum dried for at least three days prior to use.

Polymer electrolytes were fabricated from acetonitrile solutions of an ion conducting polymer such as polyethylene oxide complexed with a salt such as NaTf or $NaClO_4$ (8–20 ethylene oxide units per Na+). Solutions were cast into glass rings onto Teflon plates and allowed to air and then vacuum dry. Approximate film thicknesses were 10–100 $\mu m$.

Sodium from Alfa Products was melted, filtered through stainless steel wool to remove sodium oxide and calcium oxide impurities and then heated to 400° C. for four hours with enough titanium sponge to purify it. $Na_{3.75}Pb$ alloy was made by melting sodium with the desired amount of lead and purified the same way as sodium. Sodium or sodium/lead alloy were pressed into thin sheets at room or elevated temperatures for use as anodes in cells.

Cells were assembled by layering the Na or $Na_{3.75}Pb$ anode, polymer electrolyte and $Na_{0.7}CoO_2$ electrode between two current collectors, to which electrical contact was made. The current collectors may be surfaces of battery coin cell holders, thin foils of stainless steel, aluminum or nickel, metal coated plastic.

It will be recognized by those skilled in the art that this description may not be the only possible description, or the most accurate description of the theory of this device.

We claim:

1. A solid state secondary battery comprising
a) Current collectors,
b) A sodium cobalt bronze cathode contacting one or more of said current collectors, the sodium cobalt bronze cathode including an ion conducting polymer,
c) A solid state polymer electrolyte separator sandwiched in between said cathode and an anode, the electrolyte being substantially devoid of solvent, and
d) An anode contacting one or more of said current collectors.

2. A solid state secondary battery comprising
a) Current collectors,
b) A sodium cobalt bronze cathode contacting one or more of said current collectors,
c) A solid state polymer electrolyte separator sandwiched in between said cathode and an anode, the polymer electrolyte separator being not substantially cross-linked, and
d) An anode contacting one or more of said current collectors.

3. The battery of claim 1, wherein the polymer electrolyte separator is substantially non-cross-linked.

4. The battery of claim 2, wherein the sodium cobalt bronze cathode includes and ion sodium cobalt bronze cathodes includes an ion conducting polymer, and wherein the electrolyte is substantially devoid of solvent.

* * * * *